United States Patent Office 2,831,908
Patented Apr. 22, 1958

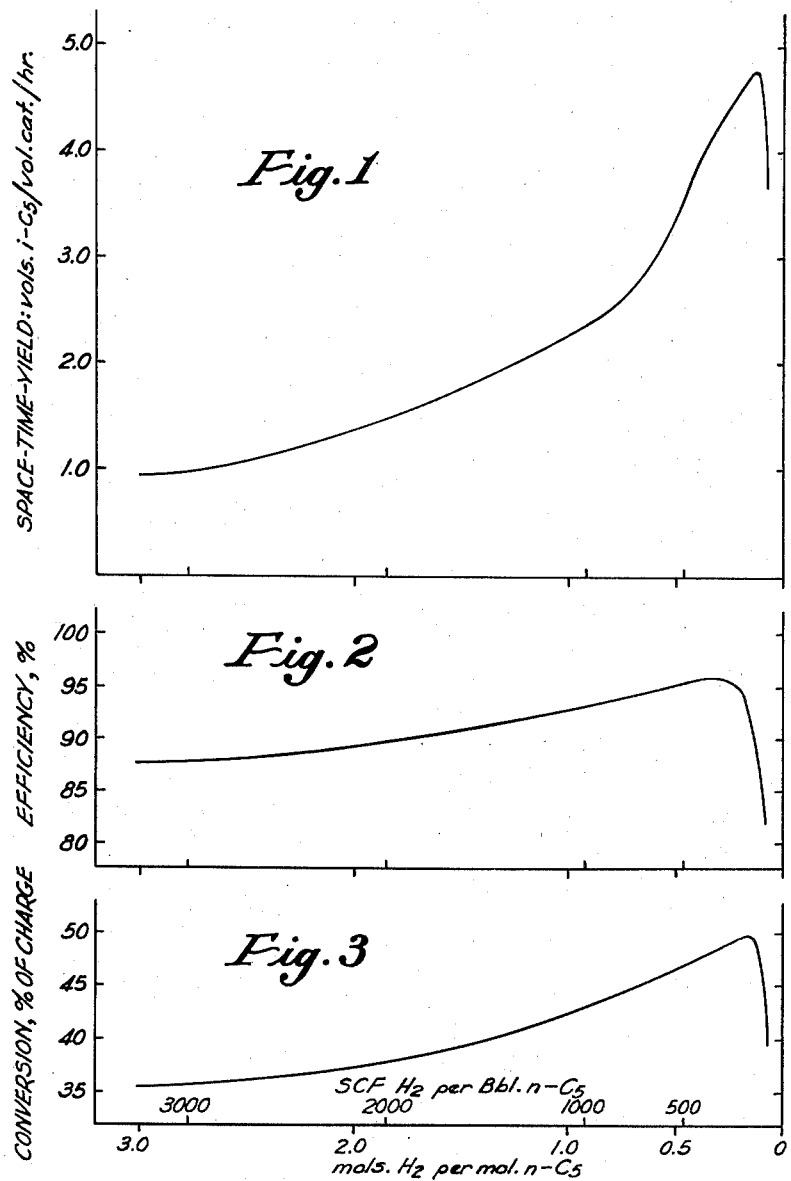

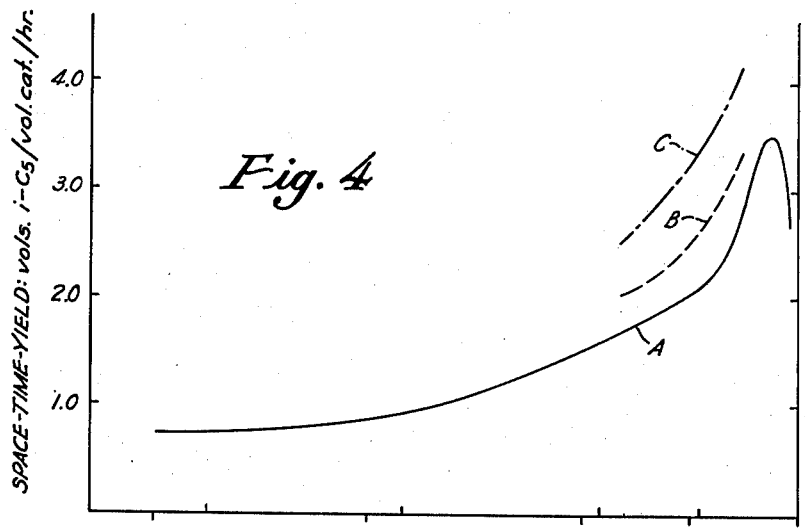
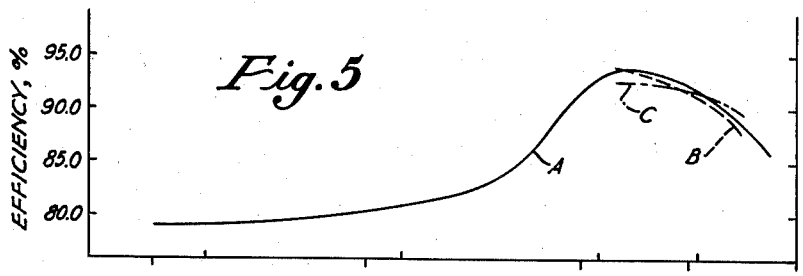
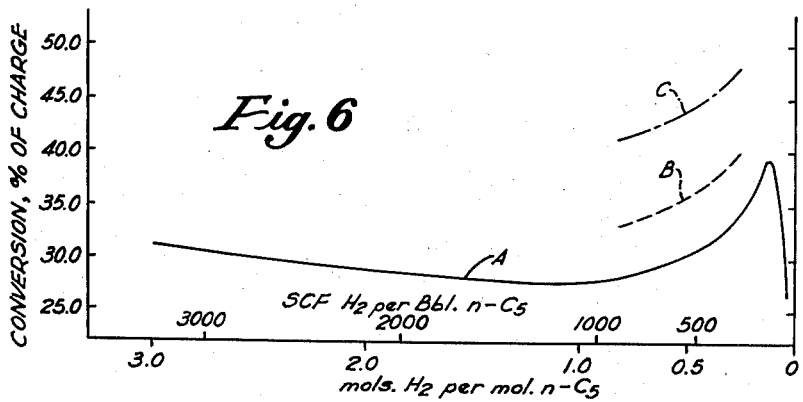

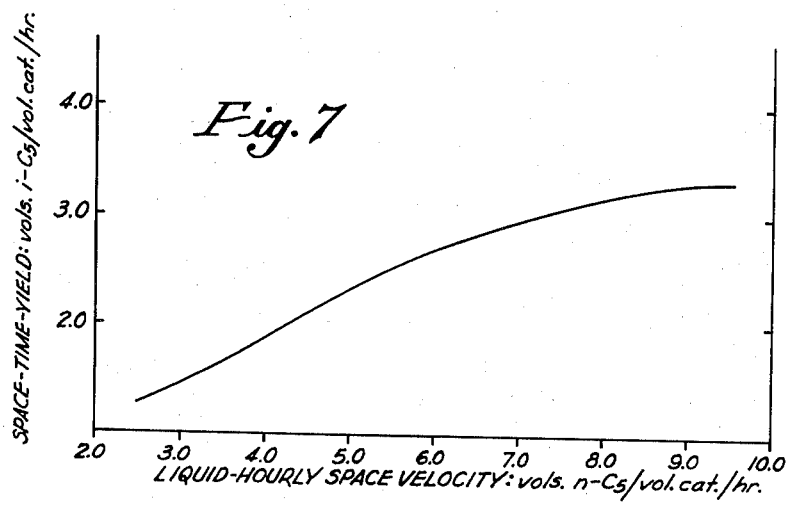

2,831,908

HYDROISOMERIZATION PROCESS

William C. Starnes and Robert C. Zabor, Pittsburgh, Pa., assignors to Gulf Research & Development Company, Pittsburgh, Pa., a corporation of Delaware Application May 17, 1955, Serial No. 508,980

5 Claims. (Cl. 260—683.65)

This invention relates to a method for isomerizing n-pentane in the presence of hydrogen and a solid catalyst.

The conversion of n-pentane to its more valuable branched-chain isomer isopentane has great commercial importance in the petroleum and chemical industries. It is very important in petroleum refining because n-pentane is a low octane number component of straight run and natural gasolines or naphthas which are to be converted to high octane gasolines. A large increase in octane rating is obtained when n-pentane is isomerized to isopentane. To illustrate this point, the research octane numbers (clear) of n-pentane and isopentane are 62 and 92 respectively. Conventional catalytic naphtha reforming methods which are effective for upgrading the higher molecular weight paraffins and the non-paraffins of the gasoline range do not satisfactorily convert n-pentane to isopentane. Therefore, a process such as the process of the present invention which is particularly effective in isomerizing n-pentane to isopentane has great value in the production of high octane gasoline.

A known process for isomerizing low molecular weight paraffins is the low temperature process (195° to 400° F.) which uses Friedel-Crafts catalysts such as aluminum chloride. This type of process has serious drawbacks; for example, the halide catalysts used in the process are corrosive to metals. Furthermore, the catalyst loss when using the halide catalysts makes the process expensive.

The present invention is concerned with a novel hydroisomerization process in which n-pentane is isomerized by contact at elevated temperature and pressure with a solid catalyst in the presence of hydrogen. It is based on the discovery of a particular novel combination of reaction conditions for isomerizing n-pentane and n-hexane using a supported platinum catalyst, whereby a markedly increased space-time-yield of isopentane is obtained.

In general, the process of the invention comprises contacting a hydrocarbon charge comprising at least 85 volume percent n-pentane, in admixture with hydrogen in a ratio of from 50 to 1,000 standard cubic feet of hydrogen per barrel of hydrocarbon in the charge, with a supported platinum catalyst at a temperature from 600° to 1,000° F. and at a liquid hourly space velocity of at least 5 volumes of paraffinic hydrocarbon per volume of catalyst per hour.

The process of the invention is characterized in its reaction conditions by the use of a very low hydrogen to hydrocarbon ratio and by the use of a high space velocity for the paraffinic charge. These reaction conditions combined with the use of a supported platinum catalyst and suitable reaction temperatures and pressures provide a novel combination of hydroisomerization conditions which greatly improve the results obtainable in isomerizing n-pentane.

The process of the invention is characterized in its results by a high space- time-yield. By space-time-yield is meant the volumes of isoparaffin produced per volume of catalyst per hour. This is a very important characteristic of the process commercially because it indicates the amount of the desired product that can be produced in a reactor of given size in a particular period of time. The process is also characterized by high efficiency in terms of the ratio of isoparaffin yield to total yield of conversion products.

The charge stock to our process comprises at least 85 volume percent n-pentane. By this we mean that our process can treat n-pentane in a substantially pure state or a mixture of the gasoline boiling range which contains n-pentane (at least 85 volume percent) and other hydrocarbons, as for example, a petroleum refinery gasoline fraction which is rich in n-pentane but which also contains other hydrocarbons present in natural or straight run gasolines. The isomerization of substantially pure n-pentane will be of interest chiefly in the chemical industry. For example, n-pentane can be treated by our process to produce isopentane as a chemical intermediate in the production of isoprene.

In the petroleum industry our preferred charge stocks are straight run or natural gasoline fractions which contain 85 volume percent or more of n-pentane. Suitable charge stocks include a refinery $C_5$ stream and a light naphtha containing at least 85 volume percent of n-pentane. Typical examples of such fractions which are suitable charge stocks include a straight run n-pentane fraction which contains 85 volume percent or more n-pentane and smaller amounts of isopentane (e. g. 8 percent) and isohexanes (e. g. 7 percent). In one valuable use for our process, a straight run gasoline is fractionally distilled into a $C_5$ fraction and a depentanized reforming charge stock. The depentanized fraction is charged to catalytic reforming. The $C_5$ fraction (preferably deisopentanized) is charged to our hydroisomerization process. The product, rich in isopentane, is then blended with the reformate to produce a high octane gasoline. It is also possible to separate the straight run gasoline into a $C_5$–$C_6$ fraction and a dehexanized fraction, hydroisomerizing the $C_5$–$C_6$ fraction in accordance with our invention, catalytically reforming the dehexanized fraction and blending the two products.

Preferably, before a refinery fraction is charged to our process, the content of isopentane is reduced by fractional distillation or other separation methods so that the further production of isopentane in our process will be favored.

Suitable charge stocks for our process also include paraffinic fractions rich in n-pentane which are separated from the products of conversion processes. For example, a suitable charge is a light paraffinic fraction, rich in n-pentane, which is obtained by distilling the reformate from a naphtha reforming process into a light and a heavy fraction. Suitable paraffinic fractions can also be obtained from reforming products by other separation methods such as solvent extraction, preferential adsorption, etc.

Although the paraffinic charge for our process can contain non-paraffinic materials, it should be substantially free of olefins. The critical hydrogen concentration of our process will be adversely affected if hydrogen is consumed in saturating olefins present in the charge.

The supported platinum catalyst for our process, preferably, is a platinum-alumina composite. However, other supporting materials, such as those known in the art for use with reforming catalyst can be used with platinum to form the catalyst for our process. Suitable supports or carriers include alumina; silica-stabilized alumina; fresh, aged or deactivated silica-alumina composites; silica-magnesia; bauxite and the like. The platinum content of the catalyst is from 0.1 to 5.0 percent by weight and preferably is from 0.2 to 1.0 percent by weight. The catalyst may contain minor amounts of combined halogen and/or sulfur as activating components. Such components may also be added indirectly to the catalyst by including them in the feed stream.

A preferred catalyst for our process consists essentially of about 0.4 percent by weight platinum, about 0.2 percent by weight chlorine, about 0.6 percent by weight fluorine and the balance alumina. Another preferred catalyst consists essentially of about 0.6 percent by weight platinum, about 0.4 percent silica, about 0.6 percent chlorine and the balance alumina. The catalyst may be placed in the reactor in the form of irregular granules but preferably it is formed into particles of uniform size and shape by pilling, extrusion, or other suitable methods.

An essential feature of our invention is based on our discovery that unexpected advantages are obtained in the hydroisomerization of n-pentane through the use in combination of a very high charge space velocity and a very low, although appreciable, concentration of hydrogen in the reaction zone. When a very low hydrogen concentration is maintained in the reaction zone and a very high space velocity is used, in accordance with the invention, even through space velocity is high, the rate of paraffin isomerization is unexpectedly so high as to result in a remarkably high space-time-yield of the desired branched-chain isomers. To accomplish this result, in accordance with the invention, the hydrogen concentration in the charge to the reaction zone is maintained below 1,000 standard cubic feet per barrel of hydrocarbon in the charge. (A standard cubic foot is measured at 60° F. and one atmosphere pressure. A barrel is 42 U. S. gallons measured at 60°F. and one atmosphere pressure.)

Improved results in accordance with the invention are obtained at hydrogen concentrations below 1,000 standard cubic feet per barrel. However, as the examples below and the graphs given in the drawings show, our invention includes the discovery that the most outstanding results are obtained with a hydrogen concentration below 400 standard cubic feet per barrel of hydrogen.

Although the concentration of hydrogen in our process is low, that is, less than 1,000 and preferably less than 400 standard cubic feet of hydrogen per barrel of hydrocarbon, the concentration of hydrogen in the reaction zone must still be appreciable. There is a minimum hydrogen concentration below which good results are not obtained, below which the catalyst is rapidly deactivated by carbonaceous deposits and the space-time-yield of isomer declines. Accordingly, a feature of the preferred modification of our process is the use of a hydrogen concentration above that at which rapid catalyst deactivation begins. Another way of saying this is that we use a hydrogen concentration above that at which the space-time-yield of isomer product ceases to increase or begins to decline if the concentration is further lowered. This will be further clarified in the discussion below of the plotted data from the specific examples.

As our examples show, the space-time-yield of isomer product in our process is greatest when we use a hydrogen concentration just above the concentration at which the catalyst activity rapidly declines. Accordingly, in the especially preferred modification of our process we use a hydrogen concentration which is near but substantially above, for example, 25 to 200 standard cubic feet per barrel above, the low hydrogen concentration at which the catalyst is rapidly deactivated by carbonaceous deposits.

In a large scale refinery operation it may be difficult to know exactly when the hydrogen concentration is too near the minimum concentration, that is, the concentration below which the catalyst is rapidly deactivated by carbonaceous deposits. A suitable method for finding the minimum hydrogen concentration for a particular operation and the optimum concentration slightly greater than the minimum, is to make a series of pilot runs with bench scale apparatus, using the same catalyst, charge stock and reaction conditions as will be used in the full size hydroisomerization unit and using a successively lower hydrogen concentration in each run. The concentration at which the catalyst is rapidly deactivated can then be determined and the full size unit will be operated at a hydrogen concentration slightly greater than (e. g. 25 to 200 standard cubic feet per barrel of hydrocarbon greater than) the determined minimum.

We have indicated that our process should use a hydrogen concentration below 1,000 and preferably below 400 standard cubic feet per barrel of hydrocarbon in the charge and that the hydrogen concentration should be above that at which the catalyst is rapidly deactivated. The minimum hydrogen concentration will differ somewhat for different operations of our process depending on the particular catalyst, charge stock and reaction conditions used. However, it can be said that in general the hydrogen concentration should be at least 50 standard cubic feet per barrel of hydrocarbon and, preferably, to avoid the danger of catalyst deactivation, at least 100 standard cubic feet per barrel.

In prior art hydroisomerization processes and in hydroreforming processes in which isomerization occurs, it has heretofore been considered that a space velocity of about 3 liquid volumes of hydrocarbon charge per volume of catalyst per hour was the maximum space velocity that could be used for high conversion of the feed at moderate temperatures. We have discovered, however, that in hydroisomerizing n-pentane under the low hydrogen concentrations described above, space velocities of from 5 to 25 liquid volumes of n-paraffin per volume of catalyst per hour and higher can be used and that, using these high space velocities in combination with the other reaction conditions of our process, the conversion of n-pentane to isopentane is still so great that a remarkably high space-time-yield of isopentane is obtained. High space-time-yields can be obtained in our process at space velocities above 25 vols./vol./hr. and it may be desirable in some instances to operate at such space velocities. However, there will usually be other economic considerations which will make it undesirable to use liquid hourly space velocities above about 25. As the examples and the plotted data show, our greatest improvement over the prior art is obtained with a space velocity of from about 8 to 12 vols./vol./hr. (The liquid-hourly space velocity units used in this specification are defined as liquid volumes of hydrocarbon measured at 60° F. and one atmosphere pressure per volume of catalyst per hour. The abbreviations LHSV and vol./vol./hr. will be used in the examples and tables.)

The improvement in space-time-yield of isopentane obtained in our process through the use of high space velocity and low hydrogen concentration is obtained at moderate reaction temperatures. Our process operates in a temperature range of from 600° to 1,000° F. However, we have discovered that the high space-time-yield which is characteristic of our process is most pronounced when reaction temperatures in the range of from 750° to 900° F. are used. The reaction pressure can range from 20 to 2,000 pounds per square inch gauge (abbreviated hereinafter as p. s. i. g.) but best results are obtained at a pressure of 50 to 500 p. s. i. g.

We have disclosed considerable ranges for certain of the operating conditions of our process. It will be understood, however, that not all possible combinations of conditions selected from within these ranges will yield the same results. Certain combinations are to be preferred for obtaining the greatest advantages of the invention. For example, when using a liquid hourly space velocity in the lower portion of our operable range of 5 to 25 vols./vol./hr. it is preferred to use a temperature somewhat lower than the temperature that might be used in combination with a very high space velocity. Likewise, when using a pressure in the lower portion of the disclosed range of 20–2,000 p. s. i. g. it will generally be preferred to use a hydrogen concentration somewhat above the lower limit so that the partial pressure of hydrogen in the reaction zone will not be too low.

Further understanding of our process can be obtained from the description which follows of one modification of the process in which a refinery pentane stream is the charge stock. This charge stock is advantageously obtained by closely fractionating a straight run petroleum naphtha to obtain a pentane fraction and then fractionating the pentane fraction in a deisopentanizing column from which isopentane is removed as overhead product and n-pentane as bottoms. The n-pentane is mixed with hydrogen, then preheated to reaction temperature and charged to the catalytic reactor under the reaction conditions described above. The reactor effluent is cooled and a separation of liquid and vapor is made in conventional manner. The liquid product can be fractionated to remove n-pentane and the n-pentane recycled to the reactor. Gaseous reactor effluent consisting principally of hydrogen can be recycled to the reactor after suitable purification. The process is essentially a non-regenerative process. That is, the reaction can be carried out for an extremely long cycle without regenerating the catalyst. However, if the catalyst activity eventually declines, the catalyst can be regenerated by burning off coke with air or nitrogen-diluted air. With the catalysts described in the examples below, the temperature of regeneration should be below 850° F.

The invention will be further illustrated by the examples which follow and by reference to the drawings of which:

Figure 1 is a plot of space-time-yield of isopentane versus hydrogen concentration;

Figure 2 is a plot of process efficiency versus hydrogen concentration;

Figure 3 is a plot of total conversion versus hydrogen concentration;

Figures 4, 5 and 6 are plots similar to Figures 1, 2 and 3 for runs made with a different platinum catalyst and at three different temperatures; and Figure 7 is a plot of space-time-yield of isopentane versus liquid hourly space velocity.

The manner in which we have carried out certain hydroisomerization runs, some within the scope of our invention and some outside, is described in Example 1 below.

EXAMPLE 1

A series of n-pentane hydroisomerization runs was carried out in a fixed bed catalytic reactor using a platinum-alumina catalyst known commercially as the U. O. P. platforming catalyst. This catalyst consisted essentially of 0.4 weight percent platinum distended on an alumina support and also contained 0.2 weight percent chlorine and 0.6 weight percent fluorine. The surface area of the catalyst was about 175 square meters per gram. The catalyst was in the form of small spherical particles. A mixture of n-pentane and hydrogen was preheated and charged to the reactor at an average catalyst bed temperature of about 830° F. and a pressure of about 500 p. s. i. g. The particular ratios of hydrogen to n-pentane in the charge and the particular space velocities of the charge for each run of the series are listed in Table I below. Table I also lists results of the hydroisomerization runs, namely, the space-time-yield of isopentane; the total conversion in terms of the weight percent ratio of total reaction products to charge; and process efficiency or weight percent ratio of isopentane product to total reaction products.

*Table I*

| Run No. | 1 | 2 | 3 | 4 | 5 | 6 | 7 |
|---|---|---|---|---|---|---|---|
| Conditions: | | | | | | | |
| Temperature, °F | 830 | 830 | 830 | 830 | 830 | 830 | 830 |
| Pressure, p. s. i. g. | 500 | 500 | 500 | 500 | 500 | 500 | 500 |
| LHSV, Vol./Vol./Hr. | 3.0 | 4.75 | 6.26 | 8.33 | 9.50 | 10.65 | 11.33 |
| H₂/Pentane Ratio: | | | | | | | |
| Mole/Mole | 3:1 | 1.5:1 | 0.82:1 | 0.43:1 | 0.25:1 | 0.11:1 | 0.08:1 |
| S. C. F./Bbl | 3,275 | 1,637 | 885 | 469 | 273 | 120 | 87 |
| Results: | | | | | | | |
| Conversion, Percent by Wt. of Charge | 35.3 | 41.9 | 42.2 | 48.3 | 48.1 | 50.3 | 39.4 |
| Efficiency, Percent | 88.4 | 90.0 | 95.7 | 93.2 | 96.5 | 88.3 | 82.2 |
| Space-Time-Yield, Vol./Vol./Hr. | 0.94 | 1.79 | 2.53 | 3.74 | 4.40 | 4.73 | 3.67 |

The results of Table I are plotted in Figures 1, 2 and 3 of the drawing. Figure 1 shows that we obtain a maximum space-time-yield of isopentane with a low hydrogen concentration and a high space velocity. Figure 2 shows that the efficiency of the process also is greatest at a low hydrogen concentration. In other words, in the runs using low hydrogen concentration the total conversion product contained the highest proportion of isopentane. Figure 3 shows that the total product yield is also greatest for the runs in the low hydrogen concentration range.

As indicated above, we prefer in our process to use a hydrogen concentration near but substantially above the hydrogen concentration below which the catalyst is rapidly deactivated. Table I and the plotted data in Figures 1, 2 and 3 show the advantages of this procedure. As Figure 1 shows, the space-time-yield of isomer reaches a peak at a low hydrogen concentration (at about 120 standard cubic feet per barrel for these particular runs). If the hydrogen concentration is further reduced the space-time-yield declines. However, the problem is not merely in the decline of space-time-yield, for, as Figure 1 shows, the space-time-yield still appears to be good beyond the peak. The problem is that the catalyst is deactivated by carbonaceous deposits if the hydrogen concentration drops below the concentration corresponding to the maximum space-time-yield. Figures 2 and 3 show that a decline in efficiency and total conversion also occurs at about the same low hydrogen concentration. Figures 1, 2 and 3 show that with our preferred procedure of using a hydrogen concentration near but substantially above the concentration corresponding to the peak of space-time-yield we obtain the highest practicable space-time-yield of isomer, a high efficiency and high total conversion while avoiding the danger of rapid catalyst deactivation.

We have performed another series of hydroisomerization runs at three different reaction temperatures and using a supported platinum catalyst somewhat different from the catalyst described in Example 1. The details are described in Example 2 below.

EXAMPLE 2

A platinum-alumina catalyst known commercially as the Sinclair-Baker catalyst was used in this series of runs. It consisted essentially of 0.6 weight percent platinum, 0.4 percent silica, 0.6 percent chlorine and the balance alumina. The surface area of the catalyst was about 330 square meters per gram. The catalyst was used in the form of small extruded particles having a diameter of about 1/16 inch. The average catalyst bed temperatures for the runs of this series were: 830° F. for runs 8 through 14; 840° F. for runs 15 and 16; and 860° F. for runs 17 and 18. Table II below gives the space velocities and hydrogen concentrations used in each run and the results in terms of space-time-yield of isopentane, total conversion and process efficiency.

Table II

| Run No | 8 | 9 | 10 | 11 | 12 | 13 | 14 | 15 | 16 | 17 | 18 |
|---|---|---|---|---|---|---|---|---|---|---|---|
| Conditions: | | | | | | | | | | | |
| Temperature, °F | 830 | 830 | 830 | 830 | 830 | 830 | 830 | 840 | 840 | 860 | 860 |
| Pressure, p. s. i. g | 500 | 500 | 500 | 500 | 500 | 500 | 500 | 500 | 500 | 500 | 500 |
| LHSV, Vol./Vol./Hr | 3.0 | 4.70 | 6.58 | 7.75 | 9.58 | 10.8 | 11.4 | 6.58 | 9.58 | 6.58 | 9.58 |
| $H_2$/Pentane Ratio: | | | | | | | | | | | |
| Mole/Mole | 3:1 | 1.5:1 | 0.82:1 | 0.43:1 | 0.25:1 | 0.11:1 | 0.03:1 | 0.82:1 | 0.25:1 | 0.82:1 | 0.25:1 |
| S. C. F./Bbl | 3,275 | 1,637 | 885 | 469 | 273 | 120 | 33 | 885 | 273 | 885 | 273 |
| Results: | | | | | | | | | | | |
| Conversion, Percent by Wt. of Charge | 31.0 | 28.5 | 27.6 | 32.3 | 33.3 | 39.4 | 26.4 | 33.4 | 40.5 | 41.7 | 48.6 |
| Efficiency, Percent | 79.0 | 82.5 | 94.9 | 92.2 | 87.3 | 86.0 | 89.8 | 94.3 | 87.7 | 92.8 | 90.2 |
| Space-Time-Yield, Vol./Vol./Hr | 0.74 | 1.11 | 1.72 | 2.18 | 2.94 | 3.54 | 2.71 | 2.07 | 3.39 | 2.56 | 4.19 |

The results listed in Table II are plotted in Figures 4, 5 and 6 of the drawings. These results agree with those obtained in the runs of Example 1. Figure 4 shows that markedly high space-time-yields are obtained in the low hydrogen concentration range of our invention, whether the process is carried out at 830° (curve A), 840° (curve B), or 860° F. (curve C). Figure 5 shows that the highest efficiency is obtained at low hydrogen concentration and Figure 6 shows that the highest total conversion is obtained at low hydrogen concentration at each of the reaction temperatures employed.

EXAMPLE 3

We have carried out another series of runs using a platinum catalyst of the type described in Example 2. In the runs of this series the same hydrogen concentration but a different liquid hourly space velocity was used for each run. The reaction temperature was 830° F., the pressure 500 p. s. i. g. and the hydrogen concentration 273 standard cubic feet of hydrogen per barrel of n-pentane. The effects of change in liquid hourly space velocity are shown in the data listed in Table III below.

Table III

| Run No | 19 | 20 | 21 | 22 | 23 | 24 |
|---|---|---|---|---|---|---|
| Conditions: | | | | | | |
| Temperature, ° F | 830 | 830 | 830 | 830 | 830 | 830 |
| Pressure, p. s. i. g | 500 | 500 | 500 | 500 | 500 | 500 |
| LHSV, Vol./Vol./Hr | 9.58 | 8 | 6 | 5 | 4 | 2.5 |
| $H_2$/Pentane Ratio: | | | | | | |
| Mole/Mole | 0.25:1 | 0.25:1 | 0.25:1 | 0.25:1 | 0.25:1 | 0.25:1 |
| S. C. F./Bbl | 273 | 273 | 273 | 273 | 273 | 273 |
| Results: Space-Time-Yield, Vol./Vol./Hr | 3.34 | 3.10 | 2.77 | 2.35 | 1.89 | 1.28 |

The results listed in Table III are presented graphically in Figure 7 of the drawings. They show clearly that when, in accordance with the invention, a low hydrogen concentration is used, a high space-time-yield of isopentane can be obtained by using high space velocities.

The expression "consisting essentially of," as used in the claims to define the hydrocarbon charge, means that the hydrocarbon charge is made up almost entirely of the components recited and these components are the main and characterizing ones. But the expression does not exclude the presence of minor amounts of hydrocarbons whose presence does not adversely affect the isomerization of the recited components.

Obviously many modifications and variations of the invention as hereinbefore set forth may be made without departing from the spirit and scope thereof and therefore only such limitations should be imposed as are indicated in the appended claims.

We claim:

1. A hydroisomerization process which comprises contacting a gasoline boiling range hydrocarbon charge comprising at least 85 volume percent n-pentane and the rest consisting essentially of other open chain paraffinic hydrocarbons in admixture with hydrogen in a ratio of from 100 to 400 standard cubic feet of hydrogen per barrel of hydrocarbon in the charge with a supported platinum catalyst containing from 0.1 to 5.0 percent by weight platinum at a reaction temperature from 600° to 900° F., a pressure from 20 to 2,000 pounds per square inch gauge and at a charge liquid hourly space velocity of from 8 to 12 volumes per volume of catalyst per hour.

2. A hydroisomerization process which comprises contacting a gasoline boiling range hydrocarbon charge comprsing at least 85 volume percent n-pentane and the rest consisting essentially of other open chain paraffinic hydrocarbons in admixture with hydrogen with a supported platinum catalyst containing from 0.1 to 5.0 percent by weight platinum at a reaction temperature from 600° to 900° F., a pressure from 20 to 2,000 pounds per square inch gauge, at a charge liquid hourly space velocity of from 8 to 12 volumes per volume of catalyst per hour, and maintaining a concentration of hydrogen in the charge of less than 1,000 standard cubic feet of hydrogen per barrel of hydrocarbon but substantially greater than the hydrogen concentration at which the catalyst is rapidly deactivated by carbonaceous deposits.

3. A hydroisomerization process which comprises contacting a hydrocarbon charge consisting essentially of n-pentane with a platinum-alumina catalyst in the presence of hydrogen in a ratio of from 100 to 400 standard cubic feet of hydrogen per barrel of hydrocarbon in the charge at a reaction temperature from 750° to 900° F., a pressure from 50 to 500 pounds per square inch gauge and at a charge liquid hourly space velocity of at least 8 volumes per volume of catalyst per hour.

4. A hydroisomerization process which comprises contacting in admixture with hydrogen a hydrocarbon charge of the gasoline boiling range comprising at least 85 volume percent n-pentane and the rest consisting essentially of other open chain paraffinic hydrocarbons with a supported platinum catalyst at a conversion temperature below 900° F., a charge liquid hourly space velocity of at least 5 volumes per volumes of catalyst per hour and maintaining a ratio of hydrogen to hydrocarbon in the charge from 50 to 1000 standard cubic feet of hydrogen per barrel of hydrocarbon.

5. A hydroisomerization process which comprises contacting in admixture with hydrogen a refinery $C_5$ fraction containing at least 85 volume percent n-pentane and the rest consisting essentially of other open chain paraffinic hydrocarbons with a platinum-alumina catalyst containing from 0.2 to 1.0 percent by weight platinum, at a reaction temperature of 600° to 900° F., a pressure of 50 to 500 pounds per square inch gauge, at a charge liquid hourly space velocity of at least 8 volumes per volume of catalyst per hour and maintaining a ratio of hydrogen to hydrocarbon in the charge near but substantially above the hydrogen concentration at which the catalyst is rapidly deactivated by carbonaceous deposits.

References Cited in the file of this patent

UNITED STATES PATENTS

| | | | |
|---|---|---|---|
| 2,479,110 | Haensel | Aug. | 16, 1949 |
| 2,642,384 | Cox | June | 16, 1953 |
| 2,736,684 | Tarnpoll | Feb. | 28, 1956 |